Oct. 21, 1947.                L. G. KETCHAM                 2,429,468
               MOUNTING STRUCTURE FOR ELECTRICAL UNITS
                        Original Filed June 2, 1945
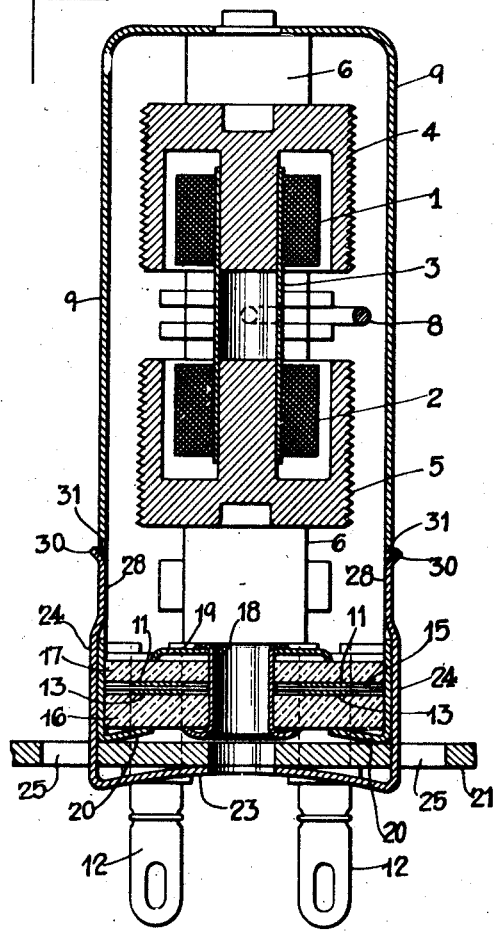
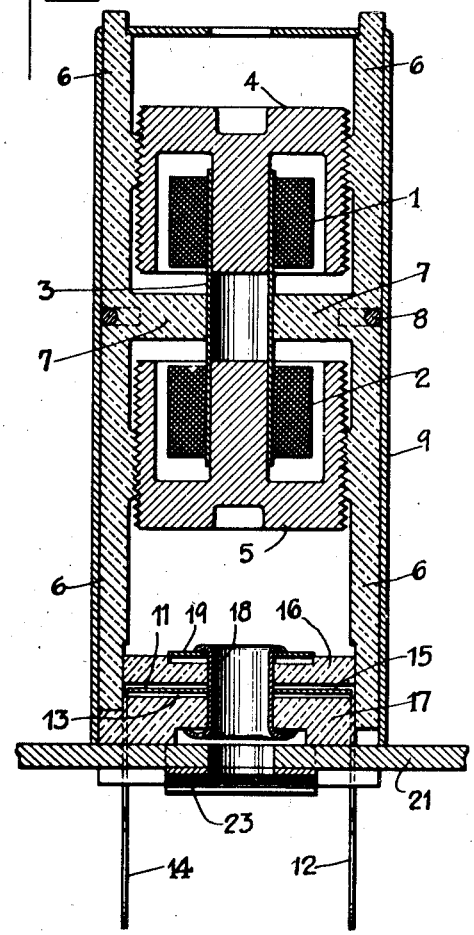
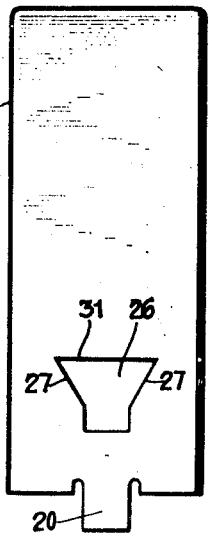
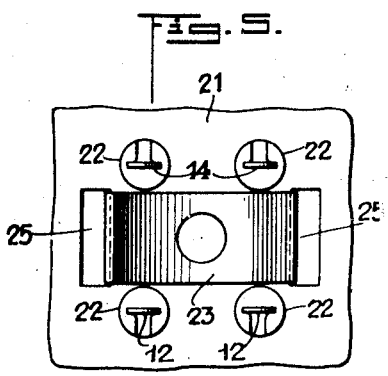
INVENTOR.
LYMAN G. KETCHAM.
BY
ATTORNEYS Patented Oct. 21, 1947

2,429,468

UNITED STATES PATENT OFFICE 2,429,468

MOUNTING STRUCTURE FOR ELECTRICAL UNITS

Lyman G. Ketcham, Kearny, N. J., assignor to Automatic Manufacturing Corporation, East Newark, N. J., a corporation of New Jersey Original application June 2, 1945, Serial No. 597,349. Divided and this application July 17, 1946, Serial No. 684,295

3 Claims. (Cl. 248—361)

The invention relates to a mounting structure for electrical units such as inductance or transformer coils, condensers and the like, or assemblies comprising such units, the construction including a housing enclosing the units and a quick detachable locking device as hereinafter described, for releasably attaching the housing and enclosed units in position with respect to a chassis, panel or equivalent mounting plate which supports the assembly. This application is a division of my earlier copending application Serial Number 597,349, filed June 2, 1945, entitled "Tuned transformer assembly."

Further objects and advantages of the invention will be in part obvious and in part specifically referred to in the description hereinafter contained which, taken in conjunction with the accompanying drawings, discloses a preferred form of mounting structure constructed in accordance with the invention; the disclosure however should be considered as merely illustrative from the standpoint of the invention in its broader aspects.

In the drawings—

Figs. 1 and 2 are central longitudinal sections taken at right angles to each other through a mounting structure constructed in accordance with the invention.

Fig. 3 is a side view showing detached, a metallic housing which constitutes part of the assembly shown in Figs. 1 and 2.

Fig. 4 is a perspective view showing detached, a spring clip which also constitutes part of said assembly.

Fig. 5 is a bottom plan view of the assembly shown in Fig. 1.

The invention is illustrated as applied to a so-called intermediate frequency transformer assembly such as is used in superheterodyne radio receiving systems and the like and which includes a pair of magnetically coupled coils across which electrical condensers are connected as known in the art. For present purposes the details of the electrical units are not important and accordingly will be described only briefly herein, reference being made to my copending application for a fuller disclosure thereof.

The present application is more particularly concerned with the housing and mounting structure of the assembly, and it should be understood that the electrical units within the housing and their relation to each other may be varied or altered to suit requirements. The illustrated units comprise electrically energized coils 1 and 2 which enclose a tubular coil form 3, adjustable cores 4 and 5 cooperating respectively with the coils 1 and 2, said coils and cores being mounted between a pair of insulating frame members 6 having inwardly projecting flanges 7 (Fig. 2) which grip the coil form 3 between them and thus hold the coils 1 and 2 in position, the cores 4 and 5 having threaded engagement with the frame members 6 as shown in Fig. 2. An appropriate metal clip 8 clamps the insulating frame members 6 together.

A metallic housing 9 which may serve as an electrostatic shield, encloses the electrically energized units above described, and the illustrated form of the invention also includes a pair of electrical condensers which are mounted in position across the open end or mouth of the housing 9.

As shown the condenser plates consist of angle shaped metallic strips having bases 11 and projecting terminals 12, and further metallic strips having bases 13 and projecting terminals 14, the inductively related bases 11 and 13 being separated by a dielectric sheet 15, and the condenser elements being clamped between a pair of insulating blocks 16 and 17 which are held together by a rivet 18, one end of which bears against the pressure plate 19. As shown the condenser structure is held in place by opposed tongues 20 at the mouth of housing 9, which are bent over into contact with the insulating block 16 as appears in Fig. 1. As above stated the internal details of the electrically energized units need not be described in greater detail, it being understood that in the illustrated embodiment of the invention appropriate electrical connections (not shown in detail) are made between the coil and condenser units.

In accordance with the present invention the housing 9 and the electrical units housed therein are detachably mounted in position with respect to and supported by a plate member 12 which may be understood as being a chassis, panel board or equivalent supporting plate or wall. The terminals 12 and 14 pass through holes 22 in the plate 21, as shown in Fig. 5. In order to clamp the assembly firmly and detachably in position in respect to the mounting plate 21, I provide a U-shaped clip of springy metal which presses the housing 9 against plate 21 and interlocks releasably with opposite side walls of housing 9. In the illustrated form, this spring clip has a bowed base 23 which engages plate 21, and legs 24 which pass through holes 25 in plate 21 and embrace opposite side walls of housing 9.

The legs 24 and side walls of the housing are provided with complementary projections and recesses which interengage to lock the clip releasably in position and clamp the parts firmly together. In the form shown the opposite side walls of housing 9 have recesses 26 therein, such recesses having side walls 27 (Fig. 3) which converge toward the mouth of the housing. As shown in Fig. 4 the spring clip has lugs 2 provided with side walls 29 complementary to recesses 26, and lips 30 which may rest against the upper walls 31 of recesses 26. The legs 24 of the clip tend to pinch the housing 9 between them, and to adjust the clip to locking position its lower corners as the parts appear in Fig. 1, are pushed upwardly against the spring action of the bowed base 23 of the clip, until the lugs 28 snap in the recesses 26. In this position the bowed base 23 of the clip resiliently urges the lugs 28 downwardly to wedge their side walls 29 tightly between the converging side walls of recesses 26. It is found that the above interengaging parts lock the housing 9 effectively but resiliently in position against rocking or tilting forces applied in any direction to the housing 9, which otherwise would tend to pry it loose and injure the strained parts. These forces are usually the most necessary to be protected against in service and it is found that a construction of the above character will normally absorb them without injury to or loosening of the assembly. When the housing 9 is to be detached for any reason, the lips 30 on the legs of the spring clip may be pried outwardly until the side walls 29 of the clip become disengaged from the side walls 27 of recesses 26, whereupon the pressure applied by the bowed base 23 of the clip will draw the lugs 28 downwardly out of alinement with the recesses 26.

While the invention has been disclosed as carried out by a mounting structure of the above described specific construction, it should be understood that changes may be made therein without departing from the invention in its broader aspects, within the scope of the appended claims.

I claim:

1. A means for securing a metallic housing containing an electrically energizable unit, to a plate, said unit having terminals projecting through said plate, said means comprising a U-shaped spring clip resiliently clamping the housing and plate together, said clip having a bowed base engaging the outer face of said mounting plate and legs extending from said base to overlap opposite sides of said housing, the housing wall having recesses therein respectively adjacent the overlapping portions of the clip legs, and such overlapping portions of the clip legs having inwardly offset lugs thereon which are substantially complementary in shape to said recesses to fit within the latter, the lugs having opposite side edges which abut closely against respectively corresponding sidewalls of the housing recesses throughout substantially the entire extent of such opposite side edges of the lugs to prevent twisting movements of the housing in directions parallel to the plate and rocking movements of the housing in directions parallel to the legs of the clip, when the clip is in operating position.

2. A means for securing a metallic housing containing an electrically energizable unit, to a plate, said unit having terminals projecting through said plate, said means comprising a U-shaped spring clip resiliently clamping the housing and plate together, said clip having a bowed base engaging the outer face of said mounting plate and legs extending from said base to overlap opposite sides of said housing, the housing wall having recesses therein respectively adjacent the overlapping portions of the clip legs, said recesses having obliquely directed side walls which converge in a direction toward the base of the clip, and such overlapping portions of the clip legs having lugs thereon which are provided with converging sidewalls substantially complementary to those of the housing and which are urged by spring pressure of the base of the clip into wedging engagement between the respective complementary side walls of the housing recesses when the clip is in operating position.

3. A means for securing a metallic housing containing an electrically energizable unit, to a plate, said unit having terminals projecting through said plate, said means comprising a U-shaped spring clip resiliently clamping the housing and plate together, said clip having a bowed base engaging the outer face of said mounting plate and legs extending from said base to overlap opposite sides of said housing, the housing wall having recesses therein respectively adjacent the overlapping portions of the clip legs, and such overlapping portions of the clip legs having inwardly offset lugs thereon which are substantially complementary in shape to said recesses to fit within the latter, the lugs having opposite side edges which abut closely against respectively corresponding sidewalls of the housing recesses throughout substantially the entire extent of such opposite side edges of the lugs to prevent twisting movements of the housing in directions parallel to the plate and rocking movements of the housing in directions parallel to the legs of the clip when the clip is in operating position, said lugs having lips projecting outwardly therefrom to overlie the respectively corresponding walls of the housing when the clip is in operating position.

LYMAN G. KETCHAM.

REFERENCES CITED

The following references are of record in the file of this patent:

UNITED STATES PATENTS

| Number | Name | Date |
|---|---|---|
| 2,211,728 | MacFadden | Aug. 13, 1940 |
| 2,225,592 | MacFadden | Dec. 17, 1940 |
| 2,230,898 | MacFadden | Feb. 4, 1941 |